3,672,990
PRODUCTION OF ELECTRODES
Fritz Beck, Ludwigshafen, and Gotthard Csizi, Bad Duerkheim, Germany, assignors to Badische Anilin- & Soda-Fabrik Aktiengesellschaft, Ludwigshafen (Rhine), Germany
Filed Mar. 25, 1970, Ser. No. 22,428
Claims priority, application Germany, Mar. 28, 1969, P 19 15 951.4
Int. Cl. B01k 3/02, 3/06; H01b 1/08
U.S. Cl. 117—230
7 Claims

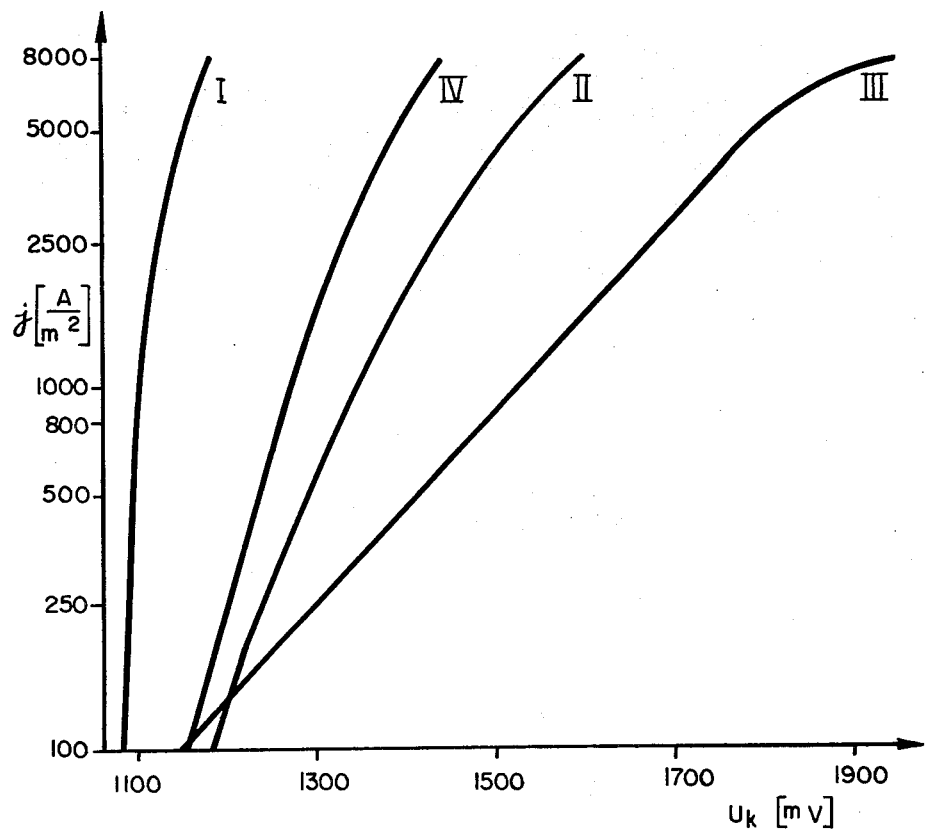

ABSTRACT OF THE DISCLOSURE

Layers of an oxide mixture of at least one platinum metal and oxides of the elements silicon, tin or germanium are applied to a core of an anodically stable material for the production of activated electrodes. For this purpose, silicon, tin or germanium or a compound thereof with the platinum metal or a compound thereof is converted into oxidic compounds and these are fixed onto the surface of the anodically stable material by thermal treatment.

---

It is known that not only graphite anodes, but also anodes of another anodically stable material, for example titanium, zirconium, niobium, tantalum, lead dioxide and magnetite may be used for electrolyses, for example for the electrolysis of alkali metal chlorides. Owing to their high overvoltage, however, these electrodes cannot be used unless at least the face turned towards the counterelectrode has been activated.

It is known that these electrodes can be activated by coating their surface with a metal of the platinum group, for example electrolytically or by vapor deposition.

Moreover, it is known from French patent specification No. 1,479,762 that a layer of an oxide of a platinum metal or alloy thereof may be applied to electrodes consisting of titanium, zirconium, niobium and tantalum or their alloys for the purpose of activating them. In addition to the said precious metal oxides, the layer may advantageously contain another oxide of a nonprecious metal, namely an oxide of the elements manganese, lead, chromium, cobalt, iron, titanium, tantalum, zirconium and silicon in an amount not exceeding 50% by weight with reference to the platinum metal oxide. In order to apply a mixed oxide coating consisting of platinum oxide and silicon oxide, for example a dispersion of 95% by weight of platinum dioxide and 5% by weight of silicon dioxide is applied to a titanium core, dried and subjected to a thermal treatment under oxidizing conditions at 800° to 1,100° C. so that the coating is fixed onto the titanium surface.

Layers applied in this way do not however adhere very well to the substrate and become detached fairly easily, particularly at high current densities.

It is an object of the present invention to provide electrodes consisting of a core (which may be applied to a conductor) whose surface is coated at least partly with a layer of a mixture of at least one oxide of a platinum metal and an oxide of a nonprecious metal which electrodes do not exhibit the said disadvantage and whose layer is firmly attached to the core.

We have now found that this object is achieved and electrodes having particularly high activity can be prepared by converting elementary silicon and/or germanium and/or tin and/or a hydrolyzable or oxidizable compound of silicon, germanium or tin in the presence of at least one platinum metal or compound thereof into oxidic compounds and fixing the mixture by thermal treatment at temperatures of from 200° to 1,200° C. onto the surface of the anodically stable material.

The process according to this invention is carried out by first mixing the elements silicon, germanium and/or tin and/or their hydrolyzable or oxidizable compounds with compounds of the platinum metals, particularly with their chlorides, oxides, hydrated oxides or chelate complexes, for example acetoacetonates and converting the silicon, germanium and/or tin and/or their above-mentioned compounds into oxidic compounds. This may be effected either on the surface of the anodically stable material or separately therefrom. In the latter case, the reaction mixture is then applied to the surface of the anodically stable material which may preferably consist of the metals titanium, tantalum, zirconium, niobium or their alloys, but may also consist of platinum metals or alloys of these metals, or of graphite, lead dioxide and magnetite. In both cases the mixture is then fixed on the surface of the anodically stable material by a thermal treatment at temperatures of from 200° to 1,200° C. The duration of this treatment depends on the temperature chosen; the lower the temperature is, the longer the period of treatment should be. The thermal treatment may advantageously be carried out under oxidizing conditions, for example in the presence of oxygen, for example air or an inert gas containing oxygen, or substances which evolve oxygen, the mixture being converted into a homogeneous mixture of oxides and being fixed at the same time.

There are various methods for the production of oxidic compounds of silicon, germanium or tin, depending on the starting materials chosen.

Starting from elementary silicon, germanium or tin, which should preferably be present in the most finely divided form possible, for example in amorphous form, it is mixed with at least one platinum metal in finely divided form, for example platinum black, and the elements are converted by treatment at elevated temperatures under oxidizing conditions, for example in the presence of oxygen or substances which evolve oxygen, into the corresponding oxides.

Another possibility consists in mixing a hydrolyzable compound, for example an alkali metal silicate or germanate, such as a waterglass solution, with the compounds of the platinum metals, precipitating silicic acid or germanic acid, from the mixture of adding acids, and fixing the product thus formed onto the surface of the anodically stable material as described above.

According to a preferred embodiment of the process of the invention, an oxidizable and/or hydrolyzable compound of silicon, germanium or tin, in the presence or absence of water, is allowed to act on a solution of one or more compounds of platinum metals. Particularly the halides, such as the fluorides, chlorides or bromides, and organic compounds, of silicon, germanium or tin are suitable as oxidizable or hydrolyzable compounds of these elements. The said compounds have the general formula $MeX_4$ in which Me denotes silicon, germanium or tin and X denotes a halogen atom, hydrogen atom, hydrocarbon radical and/or an alkoxy or aryloxy radical. The said groups may contain one to twelve, preferably one to four, carbon atoms. For example the pure halides of silicon, germanium or tin, such as the tetrafluorides, tetrachlorides and tetrabromides, or organosilicon, organogermanium or organotin compounds containing halogen, particularly chlorine, for example trichlorosilane, dichlorosilane, trimethylmonochlorosilane, dimethyldichlorosilane, monomethylphenyldichlorosilane and the corresponding compounds of germanium and tin are suitable. Particularly suitable are the esters of silicic acid and germanic acid, for example the tetramethyl, tetraethyl, tetrabutyl and tetraoctyl esters of silicic acid, and also silanes, such as monosilane or disilane, and the corresponding compounds of germanium. Suitable compounds of platinum metals are the chlorides, oxides and the chelate complexes of the platinum metals, particularly the hydrated oxides. The latter are preferred compounds for the process according to the invention because they are capable of reacting with halogen-containing compounds of silicon, germanium or tin with the elimination of hydrogen halide and particularly active surfaces can be prepared from this reaction mixture. Ruthenium and its compounds are preferred among the platinum metals.

In carrying out the process according to this invention, starting from hydrolyzable compounds having the formula $MeX_4$, it is advantageous to dissolve or disperse the platinum metal compound in a solvent and to allow the hydrolyzable compound of silicon, germanium or tin to act on the solution or dispersion. Depending on the volatility of the later compound, it may in some cases be advantageous to cool the reaction mixture in order to avoid losses. Water is an example of a solvent. When using the abovementioned hydrated oxides is inert to the silicon, germanium or tin compound, for example a hydrocarbon, such as benzene, may be used. In this case the hydrolyzable silicon or germanium compound reacts with the hydroxyl groups of the hydrated oxide of the platinum metal.

The compounds of silicon, germanium or tin and those of the platinum metals may be used in any proportions. It is advantageous however, to choose such ratios that the layer of the desired oxide mixture contains at least 50 to 95 mole percent of silicone dioxide, germanium dioxide and/or tin dioxide.

The electrodes prepared by the process according to the invention are very suitable as chloride or oxygen anodes in electrolytic cells and for the anodic oxidation of organic compounds. The electrodes are suitable (particularly when they contain ruthenium dioxide) as anodes in alkali chlorine cells and (when they contain platinum oxides) as oxygen anodes, for example in dilute sulfuric acid. There are no dissolution or passivation phenomena even at high current densities. The overvoltage, even at current densities of 1 amp per square centimeter, remains constant in time and amounts to about 100 millivolts.

The following examples illustrate the invention.

EXAMPLE 1

Ruthenium hydroxide is prepared by precipitation of an aqueous solution of soluble ruthenium trichloride with sodium carbonate. The black suspension of ruthenium hydroxide ($Ru(OH)_3$) is centrifuged off and washed with water. The aqueous suspension is evaporated almost to dryness and taken up in a mixture of solvents (ethanol and benzene in the ratio by volume of 2:1). By evaporating almost to dryness again, a practically anhydrous, alcohol-moist ruthenium(III) hydroxide is obtained.

0.5 g. of the extremely finely divided ruthenium hydroxide thus obtained is suspended in 5 ml. of diisopropyl ether and at 0° C. 1 ml. of silicochloroform is added. Ten minutes later, the substance has solidified to a black gel. This gel is taken up in 5 ml. of n-butanol and ground intensely. A black brown "paint" is obtained which adheres well.

Commercial titanium sheeting having a thickness of 2 mm. is degreased with hot dichloroethane, polished with quartz powder and pickled for four minutes in 10% by weight oxalic acid at 90° C. After having been rinsed well with water and dried, the above "paint" is applied in a thin layer with a metal brush. The application is repeated after drying at 100° C. Finally the electrode is heated in air for six minutes at 450° C. After this thermal treatment, the uncoated parts of the titanium have a brass colored tranish, but the coated parts are black violet.

The electrode prepared in this way is tested as a chlorine anode as follows: A glass vessel contains a 20% by weight sodium chloride solution at 50° C. as an electrolyte. Platinum netting serves as the cathode. The potential of the anode is measured by means of a Haber-Luggin capillary against a saturated calomel electrode. The pH value is kept at 3.0 with hydrochloric acid (concentration 20% by weight). In electrolysis for several hours at a current density of 0.8 amp/cm.$^2$, the chlorine overvoltage is only 110 millivolts and is constant with respect to time. At small current densities of a few milliamps/cm.$^2$, practically the reversible chlorine potential ($U_k = 1,080$ millivolts) is set up. Similar results are obtained when using the electrode as an oxygen anode in 10% by weight sulfuric acid.

A variant of this electrode is obtained by extending the oxalic acid pickling to two hours. The surface of the titanium is markedly roughened by this treatment so that the mixed oxide covering layer adheres particularly well. In both cases analysis gives a value of 42% by weight of ruthenium and 58% by weight of silicon in the surface layer.

In the drawing, the anodic current-potential curve of the above anode (I) is compared with those of an anode of graphite (II), of titanium which has been activated with platinum (III), and of titanium which has been coated with a mixture of ruthenium chloride and silicon dioxide having the same composition as anode I (IV), the oxides of this mixture having been prepared separately from one another.

The current-potential curves have been obtained by measurement in 20% by weight sodium chloride solution at 50° C. and at pH 3.

It may be seen from these curves that the anode I prepared according to the invention has the advantage over the prior art anodes that it has a steeper current-potential curve and for example at a current density of 8,000 amps/m.$^2$ has a chlorine overvoltage of only 100 millivolts. Moreover the reversible chlorine potential is set up at current densities of 100 amps/m.$^2$.

EXAMPLE 2

A mixture of 1 g. of ruthenium acetylacetonate

1.3 g. of dimethyldichlorosilane, 5 ml. of isopropanol and 5 ml. of n-butanol is painted twice onto a sheet of zirconium which has been pickled in 3% hydrofluoric acid, and dried. The coating is baked in air at 600° C. The anode obtained gives good results similar to those obtained in Example 1.

EXAMPLE 3

A mixture of 0.25 g. of ammonium hexachloroplatinate and 0.05 g. of amorphous silicon is ground intensely in 4 ml. of methyl glycol. The suspension is brushed onto a titanium sheet (pretreated as described in Example 1), dried, and baked at 550° C. for three minutes. Application, drying and baking are repeated twice. The electrode thus prepared is suitable for example as an oxygen anode at not too high current densities.

EXAMPLE 4

A solution (A) consists of 0.25 g. of water-soluble ruthenium trichloride and 0.2 g. of potassium chloride in 1.5 ml. of water. (B) is a suspension of 0.4 g. of freshly precipitated germanium dioxide in 2 ml. of water (by acid hydrolysis of an alkaline solution of sodium germanate). (A) and (B) are mixed, heated for ten minutes at 80° C. and then 1 ml. of methyl glycol and 0.1 ml. of concentrated hydrochloric acid are added. The greenish solution formed is applied with a brush to titanium (which has previously been pickled with a solution of 2 parts of concentrated nitric acid, 1 part of concentrated sulfuric acid, 1 part of concentrated hydrogen fluoride and 1 part of water), dried and baked for three minutes at 500° C. Application, drying and baking are repeated twice. An anode is formed which has a chlorine overvoltage of 120 millivolts at a current density of 800 milliamps/cm.$^2$ measured by the method described in Example 1.

EXAMPLE 5

A mixture of 5 ml. of n-butanol, 1 ml. of tin tetrachloride, 0.8 g. of ruthenium trichloride (water-soluble form) and 0.3 ml. of concentrated hydrochloric acid is allowed to stand for two days and is then applied to titanium expanded metal (which has been pretreated according to Example 1), dried at 100° C. and baked in air at 450° C. for four minutes. Application, drying and baking are repeated twice. An anode is obtained having a chlorine overvoltage of 100 millivolts at a current density of 1 amp/cm.$^2$, measured by the method described in Example 1.

EXAMPLE 6

Titanium sheet which has been pretreated according to Example 1 is sprayed with a solution of 1 g. of ruthenium trichloride (water-soluble form) in 10 ml. of a mixture of 50 parts of isopropanol and 50 parts of concentrated hydrochloric acid so that a thin coherent film of solution forms on the surface. The wet titanium sheet is suspended for five minutes in a chamber on the bottom of which is situated a dish of silicon tetrachloride. The SiCl$_4$ vapour hydrolyzes on the electrode to form finely divided silica. After this treatment the coated sheet is baked in air for four minutes at 500° C. When the resultant electrode is used as a chlorine anode, good values similar to those in Example 1 are obtained.

We claim:

1. A process for the production of electrodes consisting of a core of an anodically stable material whose surface is at least partly coated with an oxide mixture of at least one oxide of a metal of the platinum group and an oxide of a nonprecious metal, wherein elementary silicon, germanium and/or tin or a hydrolyzable or oxidizable compound of these elements is converted in the presence of a platinum metal or a compound thereof into oxidic compounds and the mixture is fixed onto the surface of the anodically stable material by a thermal treatment at temperatures of from 200° to 1,200° C.

2. A process as claimed in claim 1 wherein the core is applied to a conductor.

3. A process as claimed in claim 1 wherein silicon, germanium and/or tin in finely divided form together with a platinum metal in finely divided form are converted into mixed oxides by a thermal treatment under oxidizing conditions.

4. A process as claimed in claim 1 wherein the oxides of the metal of the platinum group are precipitated together with silicic acid, germanium dioxide or tin dioxide from an aqueous solution of an alkali metal silicate, germanate and/or stannate which contains a compound of a platinum metal.

5. A process as claimed in claim 1 wherein a hydrolyzable or oxidizable compound having the general formula MeX$_4$ in which Me denotes silicon, germanium or tin and X denotes fluorine, chlorine, bromine, hydrogen, and identical or different alkyl or aryl radicals and/or alkoxy or aryloxy radicals, said radicals containing up to twelve carbon atoms, is mixed with a solution of at least one platinum metal compound or a suspension thereof, with or without hydrolysis or oxidation.

6. A process as claimed in claim 1 wherein the thermal treatment is carried out under oxidizing conditions.

7. A process as claimed in claim 1 wherein the thermal treatment is carried out in the presence of oxygen.

References Cited

UNITED STATES PATENTS

| 3,470,019 | 9/1969 | Steele | 117—230 X |
| 3,506,561 | 4/1970 | Caesar | 204—290 |

WILLIAM L. JARVIS, Primary Examiner

U.S. Cl. X.R.

204—290; 117—201